J. F. WOLLENSAK.

Transom Lifter.

No. 9,307. Reissued July 20, 1880.

*WITNESSES*

Harry King

William Blackstock.

By

*INVENTOR*

John F. Wollensak

Ls. Hill.

*His Attorney.*

UNITED STATES PATENT OFFICE.

JOHN F. WOLLENSAK, OF CHICAGO, ILLINOIS.

TRANSOM-LIFTER.

SPECIFICATION forming part of Reissued Letters Patent No. 9,307, dated July 20, 1880.

Original No. 136,801, dated March 11, 1873. Application for reissue filed September 17, 1878.

*To all whom it may concern:*

Be it known that I, JOHN F. WOLLENSAK, of Chicago, in the county of Cook and State of Illinois, have invented certain new and useful Improvements in Transom Lifters and Locks; and I do hereby declare the following to be a full and exact description of the same, reference being had to the accompanying drawings, forming part of this specification, in which—

Figure 1:
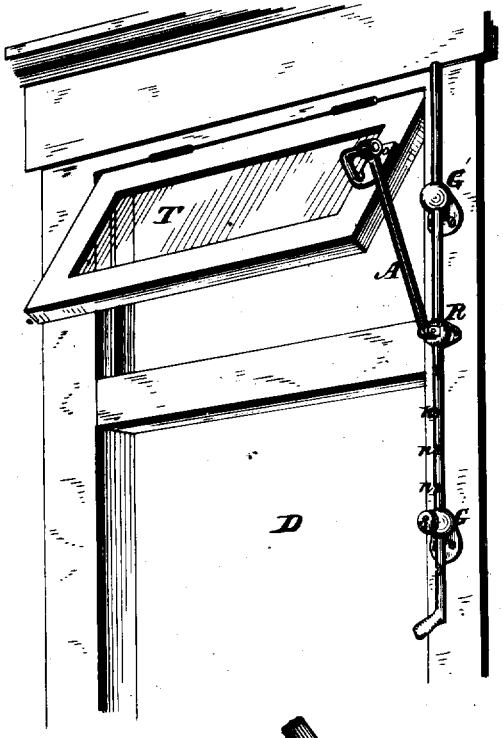
Figure 2:
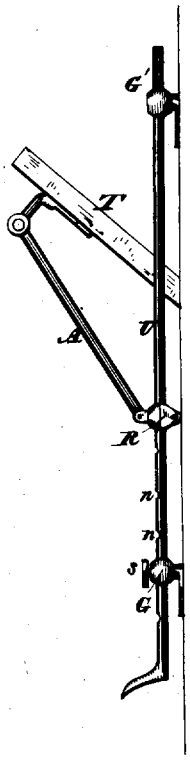
Figure 3:
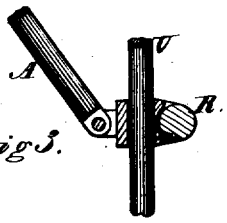

Figure 1 is a perspective view, showing one means for carrying my invention into operation. Fig. 2 is a side elevation of the same, and Fig. 3 is a detached sectional view.

Similar letters of reference in the several figures denote the same parts.

Transom-lifters have heretofore been constructed with a long upright rod or handle jointed at its upper end to a lifting-arm which extends to and is connected with the side or edge of the transom-sash, the sash being opened or closed by a vertical movement of the long rod. When thus constructed the upright rod is liable to be bent by the weight of the transom, owing to the want of support at or near the point of junction between the long rod and the lifting-arm.

The object of my invention is to remedy this difficulty; and to such end it consists in providing the proper support or support and guide for the upper end of the lifting-rod during its vertical movements and while at rest.

This may be accomplished in a variety of ways, one of which I will now proceed to describe in detail, although I wish it clearly understood that I do not limit my invention to this construction, but regard it as covering broadly any construction, combination, or arrangement of parts which shall support the long or operating rod and prevent it from being bent or displaced by the weight of the transom.

In the drawings, D is the door; T, the transom-sash, pivoted at top, bottom, or middle, as preferred; A, the lifting-arm that connects the sash to the upright rod; U, the upright rod, passing through two guides, G G′, one above and one below the point of junction with the lifting-arm; R, a friction-roller secured to the lifting-rod so as to bear against the wall and support said rod at its point of junction with the lifting-arm; *n n*, notches cut in the upright rod to receive the end of the set-screw; and *s*, a set-screw arranged, in connection with the lower guide and the rod U, so as to be convenient of operation for the purpose of fixing the transom at any required angle. The upright rod is thus supported at three points—to wit, above, below, and at the joint where it sustains the weight of the transom. It can also be adjusted and securely fastened so as to open the sash as much or as little as may be desired, and to lock it in that position.

Having thus described my invention, what I claim as new is—

1. The combination, with a transom, its lifting-arm and operating-rod, of a guide for the upper end of the operating-rod, to prevent it from being bent or displaced by the weight of the transom.

2. The roller R, arranged at the junction of the lifting-arm A and upright rod U in a transom-lifter, substantially as and for the purpose described.

3. The guide G′, arranged above the junction of the lifting-arm and upright rod, in combination with the prolonged rod U, the guide G, and arm A, substantially as and for the purpose specified.

JOHN F. WOLLENSAK.

Witnesses:
T. W. GRAY,
L. A. DOOLITTLE.